United States Patent
Bulea

(10) Patent No.: US 9,927,887 B2
(45) Date of Patent: Mar. 27, 2018

(54) LOCALIZED HAPTICS FOR TWO FINGERS

(71) Applicant: Synaptics Incorporated, San Jose, CA (US)

(72) Inventor: Mihai Bulea, San Jose, CA (US)

(73) Assignee: Synaptics Incorporated, San Jose, CA (US)

(*) Notice: Subject to any disclaimer, the term of this patent is extended or adjusted under 35 U.S.C. 154(b) by 0 days.

(21) Appl. No.: 14/986,325

(22) Filed: Dec. 31, 2015

(65) Prior Publication Data

US 2017/0192541 A1 Jul. 6, 2017

(51) Int. Cl.
| G06F 3/01 | (2006.01) |
| G06F 3/041 | (2006.01) |
| G06F 3/0354 | (2013.01) |

(52) U.S. Cl.
CPC .......... *G06F 3/03547* (2013.01); *G06F 3/016* (2013.01); *G06F 3/041* (2013.01); *G06F 2203/04104* (2013.01)

(58) Field of Classification Search
CPC ...... G06F 3/016; G06F 3/03547; G06F 3/041; G06F 2203/04104; G08B 6/00
See application file for complete search history.

(56) References Cited

U.S. PATENT DOCUMENTS

| 6,429,846 B2* | 8/2002 | Rosenberg .............. A63F 13/06 345/156 |
| 7,592,999 B2 | 9/2009 | Rosenberg et al. |
| 8,098,235 B2 | 1/2012 | Heubel et al. |
| 8,174,372 B2 | 5/2012 | da Costa |
| 8,593,409 B1 | 11/2013 | Heubel et al. |
| 8,686,952 B2 | 4/2014 | Burrough et al. |
| 8,854,331 B2 | 10/2014 | Heubel et al. |
| 9,122,325 B2* | 9/2015 | Peshkin .................. G06F 3/016 |
| 9,285,880 B2* | 3/2016 | Araki ...................... G06F 3/016 |
| 2001/0035854 A1* | 11/2001 | Rosenberg .............. A63F 13/06 345/156 |
| 2010/0188354 A1* | 7/2010 | Tamura ................ G02F 1/13338 345/173 |
| 2011/0181404 A1 | 7/2011 | Xavier et al. |
| 2011/0187658 A1* | 8/2011 | Song ....................... G06F 3/041 345/173 |

(Continued)

OTHER PUBLICATIONS

Kuchenbecker, K., Ferguson, D., Kutzer, M., Moses, M., Okamura, A. (2008). The Touch Thimble: Providing Fingertip Contact Feedback During Point-Force Haptic Interaction. In Proc. Symposium on Haptic Interfaces for Virtual Environment and Teleoperator Systems (8 Pages).

(Continued)

*Primary Examiner* — Xuemei Zheng
(74) *Attorney, Agent, or Firm* — FBFK PC

(57) ABSTRACT

An input device includes an input surface to contact a plurality of input objects. The plurality of input objects includes a first input object and a second input object. Further, the input device includes a plurality of sensor electrodes to determine positional information for the plurality of input objects on the input surface. The input device includes an actuator to move the input surface to provide haptic feedback to the first input object contacting the input surface and to isolate haptic feedback to the second input object contacting the input surface.

18 Claims, 5 Drawing Sheets

(56) References Cited

U.S. PATENT DOCUMENTS

| | | | |
|---|---|---|---|
| 2012/0286847 A1* | 11/2012 | Peshkin | G06F 3/016 |
| | | | 327/517 |
| 2012/0287068 A1 | 11/2012 | Colgate et al. | |
| 2012/0319987 A1* | 12/2012 | Woo | G06F 3/016 |
| | | | 345/174 |
| 2012/0326999 A1* | 12/2012 | Colgate | G06F 3/016 |
| | | | 345/173 |
| 2012/0327025 A1* | 12/2012 | Huska | G06F 3/016 |
| | | | 345/174 |
| 2013/0234972 A1 | 9/2013 | Bogsanyi | |
| 2014/0375580 A1 | 12/2014 | Peshkin et al. | |
| 2015/0301673 A1* | 10/2015 | Peshkin | G06F 3/016 |
| | | | 345/174 |

OTHER PUBLICATIONS

Sinclair, M., Pahud, M., Benko, H., (2013). TouchMover: Actuated 3D Touchscreen with Haptic Feedback (10 Pages).

* cited by examiner

LOCALIZED HAPTICS FOR TWO FINGERS

FIELD

This invention generally relates to electronic devices.

BACKGROUND

Input devices, including proximity sensor devices (also commonly called touchpads or touch sensor devices), are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

SUMMARY

In general, in one aspect, one or more embodiments relate to an input device. The input device includes an input surface to contact a plurality of input objects. The plurality of input objects includes a first input object and a second input object. Further, the input device includes a plurality of sensor electrodes to determine positional information for the plurality of input objects on the input surface. The input device includes an actuator to move the input surface to provide haptic feedback to the first input object contacting the input surface and to isolate haptic feedback to the second input object contacting the input surface.

In general, in one aspect, one or more embodiments relate to a processing system for an input device. The processing system includes a sensor module comprising circuitry coupled to a plurality of sensor electrodes, the sensor module configured to transmit transmitter signals and to receive resulting signals with at least a portion of the plurality of sensor electrodes. The processing system includes a determination module comprising circuitry configured to determine positional information for a plurality input objects simultaneously contacting an input surface. The plurality of input objects comprises a first input object and a second input object. The determination module is configured to determine positional information of the first input object, determine positional information of the second input object, determine a subsequent location of the first input object, and actuate an actuator to provide haptic feedback to the first input object and to isolate haptic feedback to the second input object.

Other aspects of the invention will be apparent from the following description and the appended claims.

BRIEF DESCRIPTION OF DRAWINGS

The preferred exemplary embodiment of the present invention will hereinafter be described in conjunction with the appended drawings, where like designations denote like elements.

DETAILED DESCRIPTION

The following detailed description is merely exemplary in nature, and is not intended to limit the invention or the application and uses of the invention. Furthermore, there is no intention to be bound by any expressed or implied theory presented in the preceding technical field, background, brief summary or the following detailed description.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Figure 1:
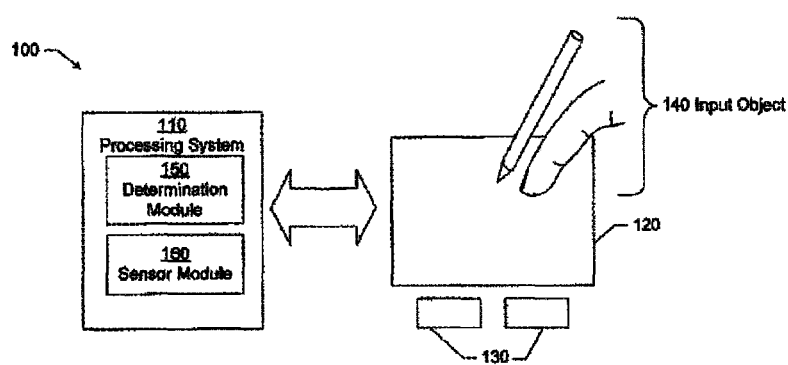
FIG. 1 is a block diagram of an example system that includes an input device in accordance with an embodiment of the invention.

Turning now to the figures, FIG. 1 is a block diagram of an exemplary input device (100), in accordance with embodiments of the invention. The input device (100) may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device (100) and separate joysticks or key switches. Further example electronic systems include peripherals, such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set top boxes, music players, digital photo frames, and digital cameras). Additionally, the electronic system could be a host or a slave to the input device.

The input device (100) may be implemented as a physical part of the electronic system, or may be physically separate from the electronic system. Further, portions of the input device (100) may be part of the electronic system. For example, all or part of the determination module may be implemented in the device driver of the electronic system. As appropriate, the input device (100) may communicate with parts of the electronic system using any one or more of the following: buses, networks, and other wired or wireless interconnections. Examples include I2C, SPI, PS/2, Universal Serial Bus (USB), Bluetooth, RF, and IRDA.

In FIG. 1, the input device (100) is shown as a proximity sensor device (also often referred to as a "touchpad" or a "touch sensor device") configured to sense input provided by one or more input objects (140) in a sensing region (120). Example input objects include fingers and styli, as shown in FIG. 1. Throughout the specification, the singular form of input object is used. Although the singular form is used, multiple input objects may exist in the sensing region (120). Further, the particular input objects are in the sensing region may change over the course of one or more gestures. To avoid unnecessarily complicating the description, the singular form of input object is used and refers to all of the above variations.

The sensing region (120) encompasses any space above, around, in and/or near the input device (100) in which the input device (100) is able to detect user input (e.g., user input provided by one or more input objects (140)). The sizes, shapes, and locations of particular sensing regions may vary widely from embodiment to embodiment.

In some embodiments, the sensing region (120) extends from a surface of the input device (100) in one or more directions into space until signal-to-noise ratios prevent sufficiently accurate object detection. The extension above the surface of the input device may be referred to as the above surface sensing region. The distance to which this sensing region (120) extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device (100), contact with an input surface (e.g. a touch surface) of the input device (100), contact with an input surface of the input device (100) coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region (120) has a rectangular shape when projected onto an input surface of the input device (100).

The input device (100) may utilize any combination of sensor components and sensing technologies to detect user input in the sensing region (120). The input device (100) includes one or more sensing elements for detecting user input. As several non-limiting examples, the input device (100) may use capacitive, elastive, resistive, inductive, magnetic, acoustic, ultrasonic, and/or optical techniques.

Some implementations are configured to provide images that span one, two, three, or higher-dimensional spaces. Some implementations are configured to provide projections of input along particular axes or planes. Further, some implementations may be configured to provide a combination of one or more images and one or more projections.

In some resistive implementations of the input device (100), a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device (100), one or more sensing elements pick up loop currents induced by a resonating coil or pair of coils. Some combination of the magnitude, phase, and frequency of the currents may then be used to determine positional information.

In some capacitive implementations of the input device (100), voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g., system ground), and by detecting the capacitive coupling between the sensor electrodes and input objects. The reference voltage may be a substantially constant voltage or a varying voltage and in various embodiments; the reference voltage may be system ground. Measurements acquired using absolute capacitance sensing methods may be referred to as absolute capacitive measurements.

Some capacitive implementations utilize "mutual capacitance" (or "trans capacitance") sensing methods based on changes in the capacitive coupling between sensor electrodes. In various embodiments, an input object near the sensor electrodes alters the electric field between the sensor electrodes, thus changing the measured capacitive coupling. In one implementation, a mutual capacitance sensing method operates by detecting the capacitive coupling between one or more transmitter sensor electrodes (also "transmitter electrodes" or "transmitter") and one or more receiver sensor electrodes (also "receiver electrodes" or "receiver"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. The reference voltage may be a substantially constant voltage and in various embodiments; the reference voltage may be system ground. In some embodiments, transmitter sensor electrodes may both be modulated. The transmitter electrodes are modulated relative to the receiver electrodes to transmit transmitter signals and to facilitate receipt of resulting signals. A resulting signal may include effect(s) corresponding to one or more transmitter signals, and/or to one or more sources of environmental interference (e.g., other electromagnetic signals). The effect(s) may be the transmitter signal, a change in the transmitter signal caused by one or more input objects and/or environmental interference, or other such effects. Sensor electrodes may be dedicated transmitters or receivers, or may be configured to both transmit and receive. Measurements acquired using mutual capacitance sensing methods may be referred to as mutual capacitance measurements.

Further, the sensor electrodes may be of varying shapes and/or sizes. The same shapes and/or sizes of sensor electrodes may or may not be in the same groups. For example, in some embodiments, receiver electrodes may be of the same shapes and/or sizes while, in other embodiments, receiver electrodes may be varying shapes and/or sizes.

In FIG. 1, a processing system (110) is shown as part of the input device (100). The processing system (110) is configured to operate the hardware of the input device (100) to detect input in the sensing region (120). The processing system (110) includes parts of, or all of, one or more integrated circuits (ICs) and/or other circuitry components. For example, a processing system for a mutual capacitance sensor device may include transmitter circuitry configured to transmit signals with transmitter sensor electrodes, and/or receiver circuitry configured to receive signals with receiver sensor electrodes. Further, a processing system for an absolute capacitance sensor device may include driver circuitry configured to drive absolute capacitance signals onto sensor electrodes, and/or receiver circuitry configured to receive signals with those sensor electrodes. In one or more embodiments, a processing system for a combined mutual and absolute capacitance sensor device may include any combination of the above described mutual and absolute capacitance circuitry. In some embodiments, the processing system (110) also includes electronically-readable instructions, such as firmware code, software code, and/or the like. In some embodiments, components composing the processing system (110) are located together, such as near sensing element(s) of the input device (100). In other embodiments, components of processing system (110) are physically separate with one or more components close to the sensing element(s) of the input device (100), and one or more components elsewhere. For example, the input device (100) may be a peripheral coupled to a computing device, and the processing system (110) may include software configured to run on a central processing unit of the computing device and one or more ICs (perhaps with associated firmware) separate from the central processing unit. As another example, the input device (100) may be physically integrated in a mobile device, and the processing system (110) may include circuits and firmware that are part of a main processor of the mobile device. In some embodiments, the processing system (110) is dedicated to implementing the input device (100). In other embodiments, the processing system (110) also performs other functions, such as operating display screens, driving haptic actuators, etc.

The processing system (110) may be implemented as a set of modules that handle different functions of the processing system (110). Each module may include circuitry that is a part of the processing system (110), firmware, software, or a combination thereof. In various embodiments, different combinations of modules may be used. For example, as shown in FIG. 1, the processing system (110) may include a determination module (150) and a sensor module (160). The determination module (150) may include functionality to determine when at least one input object is in a sensing region, determine signal to noise ratio, determine positional information of an input object, identify a gesture, determine an action to perform based on the gesture, a combination of gestures or other information, and/or perform other operations.

The sensor module (160) may include functionality to drive the sensing elements to transmit transmitter signals and receive the resulting signals. For example, the sensor module (160) may include sensory circuitry that is coupled to the sensing elements. The sensor module (160) may include, for example, a transmitter module and a receiver module. The transmitter module may include transmitter circuitry that is coupled to a transmitting portion of the sensing elements. The receiver module may include receiver circuitry coupled to a receiving portion of the sensing elements and may include functionality to receive the resulting signals.

Although FIG. 1 shows only a determination module (150) and a sensor module (160), alternative or additional modules may exist in accordance with one or more embodiments of the invention. Such alternative or additional modules may correspond to distinct modules or sub-modules than one or more of the modules discussed above. Example alternative or additional modules include hardware operation modules for operating hardware such as sensor electrodes and display screens, data processing modules for processing data such as sensor signals and positional information, reporting modules for reporting information, and identification modules configured to identify gestures, such as mode changing gestures, and mode changing modules for changing operation modes. Further, the various modules may be combined in separate integrated circuits. For example, a first module may be comprised at least partially within a first integrated circuit and a separate module may be comprised at least partially within a second integrated circuit. Further, portions of a single module may span multiple integrated circuits. In some embodiments, the processing system as a whole may perform the operations of the various modules.

In some embodiments, the processing system (110) responds to user input (or lack of user input) in the sensing region (120) directly by causing one or more actions. Example actions include changing operation modes, as well as graphical user interface (GUI) actions such as cursor movement, selection, menu navigation, and other functions. In some embodiments, the processing system (110) provides information about the input (or lack of input) to some part of the electronic system (e.g. to a central processing system of the electronic system that is separate from the processing system (110), if such a separate central processing system exists). In some embodiments, some part of the electronic system processes information received from the processing system (110) to act on user input, such as to facilitate a full range of actions, including mode changing actions and GUI actions.

For example, in some embodiments, the processing system (110) operates the sensing element(s) of the input device (100) to produce electrical signals indicative of input (or lack of input) in the sensing region (120). The processing system (110) may perform any appropriate amount of processing on the electrical signals in producing the information provided to the electronic system. For example, the processing system (110) may digitize analog electrical signals obtained from the sensor electrodes. As another example, the processing system (110) may perform filtering or other signal conditioning. As yet another example, the processing system (110) may subtract or otherwise account for a baseline, such that the information reflects a difference between the electrical signals and the baseline. As yet further examples, the processing system (110) may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device (100) is implemented with additional input components that are operated by the processing system (110) or by some other processing system. These additional input components may provide redundant functionality for input in the sensing region (120), or some other functionality. FIG. 1 shows buttons (130) near the sensing region (120) that may be used to facilitate selection of items using the input device (100). Other types of additional input components include sliders, balls, wheels, switches, and the like. Conversely, in some embodiments, the input device (100) may be implemented with no other input components.

In some embodiments, the input device (100) includes a touch screen interface, and the sensing region (120) overlaps at least part of an active area of a display screen. For example, the input device (100) may include substantially transparent sensor electrodes overlaying the display screen and provide a touch screen interface for the associated electronic system. The display screen may be any type of dynamic display capable of displaying a visual interface to a user, and may include any type of light-emitting diode (LED), organic LED (OLED), cathode ray tube (CRT), liquid crystal display (LCD), plasma, electroluminescence (EL), or other display technology. The input device (100) and the display screen may share physical elements. For example, some embodiments may utilize some of the same electrical components for displaying and sensing. In various embodiments, one or more display electrodes of a display device may be configured for both display updating and input sensing. As another example, the display screen may be operated in part or in total by the processing system (110).

It should be understood that while many embodiments of the invention are described in the context of a fully-functioning apparatus, the mechanisms of the present invention are capable of being distributed as a program product (e.g., software) in a variety of forms. For example, the mechanisms of the present invention may be implemented and distributed as a software program on information-bearing media that are readable by electronic processors (e.g., non-transitory computer-readable and/or recordable/writable information bearing media that is readable by the processing system (110)). Additionally, the embodiments of the present invention apply equally regardless of the particular type of medium used to carry out the distribution. For example, software instructions in the form of computer readable program code to perform embodiments of the invention may be stored, in whole or in part, temporarily or permanently, on a non-transitory computer-readable storage medium. Examples of non-transitory, electronically-readable media include various discs, physical memory, memory, memory sticks, memory cards, memory modules, and or any other computer readable storage medium. Electronically-readable media may be based on flash, optical, magnetic, holographic, or any other storage technology.

Although not shown in FIG. 1, the processing system, the input device, and/or the host system may include one or more computer processor(s), associated memory (e.g., random access memory (RAM), cache memory, flash memory, etc.), one or more storage device(s) (e.g., a hard disk, an optical drive such as a compact disk (CD) drive or digital versatile disk (DVD) drive, a flash memory stick, etc.), and numerous other elements and functionalities. The computer processor(s) may be an integrated circuit for processing instructions. For example, the computer processor(s) may be one or more cores or micro-cores of a processor. Further, one or more elements of one or more embodiments may be located at a remote location and connected to the other elements over a network. Further, embodiments of the invention may be implemented on a distributed system having several nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While FIG. 1 shows a configuration of components, other configurations may be used without departing from the scope of the invention. For example, various components may be combined to create a single component. As another example, the functionality performed by a single component may be performed by two or more components.

One or more embodiments are directed to an input device. In one or more embodiments, the input device includes an input surface to contact a plurality of input objects. In one or more embodiments, the plurality of input objects includes a first input object and a second input object. Further, in one or more embodiments, the input device includes a plurality of sensor electrodes to determine positional information for the plurality of input objects on the input surface.

Figure 2:
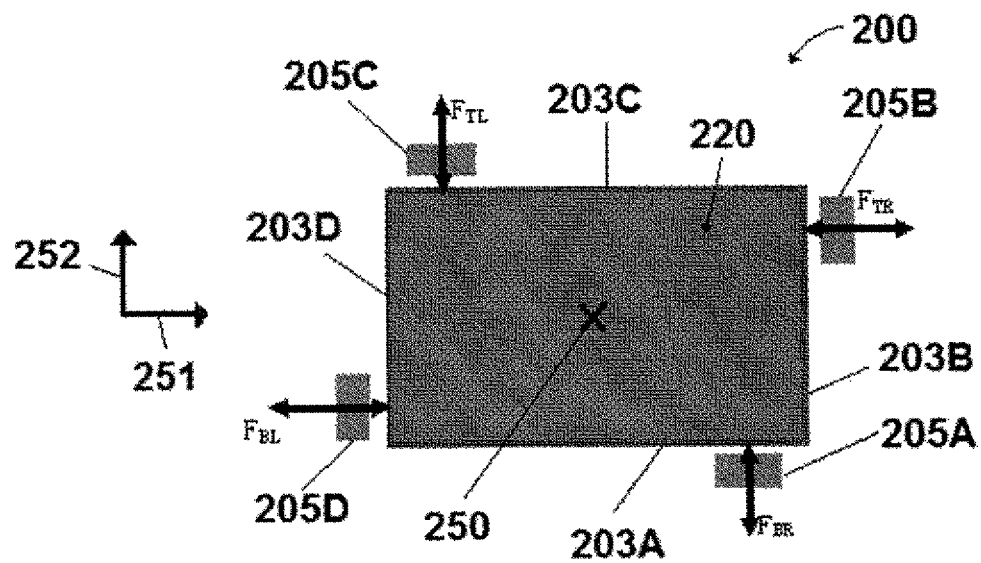
FIG. 2 is a schematic diagram of an example input device in accordance with one or more embodiments of the invention.

Referring to FIG. 2, a schematic view of an input device (200) is shown. As shown, the input device (200) includes an input surface (220) to contact a plurality of input objects, e.g., the input objects (140) shown in FIG. 1. In one or more embodiments, the plurality of input objects includes a first input object and a second input object, e.g., a first finger of a user and a second finger of the user. Further, in one or more embodiments, the input device (200) includes a plurality of sensor electrodes to determine positional information for the plurality of input objects on the input surface (220). In one or more embodiments, the plurality of sensor electrodes determine force applied by the input objects, e.g., the input objects (140), on the input surface (220). For more information on sensor electrodes, see FIG. 1 and the accompanying description.

Further, in one or more embodiments, the input device includes an actuator to move the input surface to provide haptic feedback to the first input object contacting the input surface and to isolate haptic feedback to the second input object contacting the input surface. In one or more embodiments, the input device (200) includes an actuator, e.g., actuators (205A), (205B), (205C), or (205D), to move the input surface (220) to provide haptic feedback to the first input object, e.g., a first finger of a user, contacting the input surface (220) and to isolate haptic feedback to the second input object, e.g., a second finger of the user, contacting the input surface (220). In one or more embodiments, the actuator, e.g., actuators (205A), (205B), (205C), or (205D), includes an electromagnet, a piezoelectric assembly, or other assembly that may be actuated to move the input surface (220) of the input device (200). In one or more embodiments, the plurality of actuators (205A), (205B), (205C), and (205D) may induce forces, e.g., to push and/or to pull the input surface (220), in at least one of the directions $F_{TL}$, $F_{TR}$, $F_{BR}$, and $F_{BL}$ shown in FIG. 2.

In one or more embodiments, providing haptic feedback to the first input object contacting the input surface (220) may be achieved by moving the input surface (220) relative to first input object. As will be discussed further below, movement of the input surface (220) may include displacement of the input surface (220) relative to the first input object in a direction of a first axis (251) and/or a second axis (252) relative to the first input object. Moreover, in one or more embodiments, movement of the input surface (220) may include rotation of the input surface (220) relative to the first input object such that a center of rotation of the input surface (220) is not located directly below a contact area between the first input object and the input surface (220).

Similarly, in one or more embodiments, isolating haptic feedback to the second input object contacting the input surface (22) may be achieved by preventing movement of the input surface (220) relative to second input object. For example, in one or more embodiments, isolation of haptic feedback to the second input object may be achieved by restricting displacement of the input surface (220) relative to the second input object in the direction of the first axis (251) and/or the second axis (252) relative to the second input object. Further, in one or more embodiments, isolation of haptic feedback to the second input object may be achieved by restricting rotation of the input surface (220) relative to the second input object. In one or more embodiments, relative rotation between the input surface (220) and the second input object may be achieved by actuating the plurality of actuators (205A), (205B), (205C), and (205D) in a way that the resultant force acting on the input surface (220) induces planar rotation of the input surface (220) such that a center of rotation of the input surface (220) is located directly below a contact area between the second input object and the input surface (220), as will be discussed further below.

As shown in FIG. 2, one or more embodiments of the input device (200) may include the plurality of actuators (205A), (205B), (205C), and (205D) configured to actuate the input surface (220). In one or more embodiments, the plurality of actuators (205A), (205B), (205C), and (205D) may be disposed on an edge surface (203A), (203B), (203C), or (203D) of the input surface (220). As shown, the plurality of actuators (205A), (205B), (205C), and (205D) are disposed on edge surfaces (203A), (203B), (203C), and (203D) of the input surface (220), respectively. However, in other embodiments, the plurality of actuators may be coupled to the input surface (220), e.g., via the bottom of the input surface (220) or though linkages coupled to the input surface.

Further, in one or more embodiments, the plurality of actuators (205A), (205B), (205C), and (205D) may be disposed on similar portions of the edge surfaces (203A), (203B), (203C), and (203D) of the input surface (220), e.g., proximate corners of the input surface (220), to allow movement of the input surface (220). For example, as shown, the plurality of actuators (205A), (205B), (205C), and (205D) are disposed on a right portion of the edge surfaces (203A), (203B), (203C), and (203D) of the input surface (220), respectively. Alternatively, in one or more embodiments, the plurality of actuators (205A), (205B), (205C), and (205D) are disposed on a left portion of the edge surface (203A), (203B), (203C), and (203D) of the input surface (220), respectively. Moreover, in one or more embodiments, the plurality of actuators (205A), (205B), (205C), and (205D) are disposed on a right-center portion of the edge surfaces (203A), (203B), (203C), and (203D) of the input surface (220), respectively. Such arrangements of the plurality of actuators (205A), (205B), (205C), and (205D) may allow actuation of the plurality of actuators (205A), (205B), (205C), and (205D) to move the input surface (220), as will be discussed further below.

However, in one or more embodiments, the plurality of actuators (205A), (205B), (205C), and (205D) are not necessarily disposed on similar portions of the respective edge surfaces (203A), (203B), (203C), and (203D) of the input surface (220). Arrangements in which the plurality of actuators (205A), (205B), (205C), and (205D) are disposed on different portions of the respective edge surfaces (203A), (203B), (203C), and (203D) of the input surface (220) may still allow movement of the input surface (220) upon actuation of the plurality of actuators (205A), (205B), (205C), and (205D).

Although a plurality of actuators (205A), (205B), (205C), and (205D) are shown, one or more embodiments may include a single actuator, e.g., one of actuators (205A), (205B), (205C), or (205D), to move the input surface (220) to provide haptic feedback to the first input object contacting the input surface (220) and to isolate haptic feedback to the second input object contacting the input surface (220).

In one or more embodiments, the actuator may move an entirety of the input surface to provide haptic feedback to the first input object. For example, in one or more embodiments, one or more of the plurality of actuators (205A), (205B), (205C), and (205D) may be actuated to move an entirety of the input surface (220) to provide haptic feedback to the first input object, e.g., a first finger of a user.

In one or more embodiments, the actuator may rotate the input surface in at least one of a first planar direction and a second planar direction, in which both the first planar direction and the second planar direction are about an axis that extends in a direction perpendicular to a plane of the input surface. For example, as shown in FIG. 2, the axis (250) is shown that extends in a direction perpendicular to a plane of the input surface (220), e.g., into the page and/or out of the page. In one or more embodiments, the plurality of actuators (205A), (205B), (205C), and (205D) may be actuated such that the resultant force that acts on the input surface (220) of the input device (200) induces planar rotation of the entirety of the input surface (220) about the axis (250). In other words, in one or more embodiments, the plurality of actuators (205A), (205B), (205C), and (205D) may be actuated such that the resultant force that acts on the input surface (220) causes an entirety the input surface (220) to rotate in a clockwise direction or a counter-clockwise direction.

Further, in one or more embodiments, the actuator may rotate the input surface a first rotational direction about a first axis that is parallel to a plane of the input surface and a second rotational direction about a second axis that is parallel to the plane of the input surface and perpendicular to the first axis. For example, as shown in FIG. 2, the first axis (251) is shown that is parallel to a plane of the input surface (220), and the second axis (252) is shown that is also parallel to the plane of the input surface (220) and is perpendicular to the first axis (251). In one or more embodiments, one or more of the plurality of actuators (205A), (205B), (205C), and (205D) may be actuated such that the resultant force that acts on the input surface (220) causes an entirety of the input surface (220) to rotate in a first rotational direction about the first axis (251) or in a second rotational direction about the second axis (252) to provide haptic feedback to the first input object.

As such, movement of the input surface (220) in the input device (200) may include displacement of the input surface (220) relative to the first input object in a direction of the first axis (251) and/or the second axis (252) relative to the first input object. For example, in one or more embodiments, actuation of the plurality of actuators (205A), (205B), (205C), and (205D) may induce a resultant force that acts on the input surface (220) and causes an entirety the input surface (220) to displace along the first axis (251) and/or the second axis (252). Such displacement of the input surface (220) relative to a first input object, e.g., the first finger of the user, may result in haptic feedback to the first input object contacting the input surface (220).

Further, movement of the input surface (220) may include rotation of the input surface (220) relative to the rest of the input device (200). For example, in one or more embodiments, actuation of the plurality of actuators (205A), (205B), (205C), and (205D) may induce a resultant force that acts on the input surface (220) and causes an entirety the input surface (220) to rotate in one or more directions, e.g., along an axis (250), the first axis (251), and/or the second axis (252). In one or more embodiments, actuation of the plurality of actuators (205A), (205B), (205C), and (205D) may result in rotation of the input surface (220) relative to the first input object such that a center of rotation of the input surface (220) is not located directly below a contact area between the first input object and the input surface (220), which may result in haptic feedback to the first input object. Further, in one or more embodiments, actuation of the plurality of actuators (205A), (205B), (205C), and (205D) may result in rotation of the input surface (220) relative to the second input object such that a center of rotation of the input surface (220) is located directly below a contact area between the second input object and the input surface (220), which may result in isolation of haptic feedback to the second input object.

Because the plurality of actuators (205A), (205B), (205C), and (205D) can rotate the input surface (220) about any of the axis (250), the first axis (251), and the second axis (252), the plurality of actuators (205A), (205B), (205C), and (205D) may be considered to be able to move the input surface with three degrees of freedom. In one or more embodiments, the first degree of freedom include the first planar direction and the second planar direction about the axis (250), a second degree of freedom may include the first rotational direction about the first axis (251), and a third degree of freedom may include the second rotational direction about the second axis (252).

In one or more embodiments, the actuator may isolate haptic feedback to a third input object that contacts the input surface. For example, in one or more embodiments, a third input object, e.g., a third finger of the user, may contact the input surface (220) of the input device (200). In one or more embodiments, actuation of the plurality of actuators (205A), (205B), (205C), and (205D) may induce a resultant force that acts on the input surface (220) and causes an entirety the input surface (220) to rotate relative to the third input object such that a center of rotation of the input surface (220) is located directly below a contact area between the third input object and the input surface (220), which may result in isolation of haptic feedback to the third input object.

Figure 3:
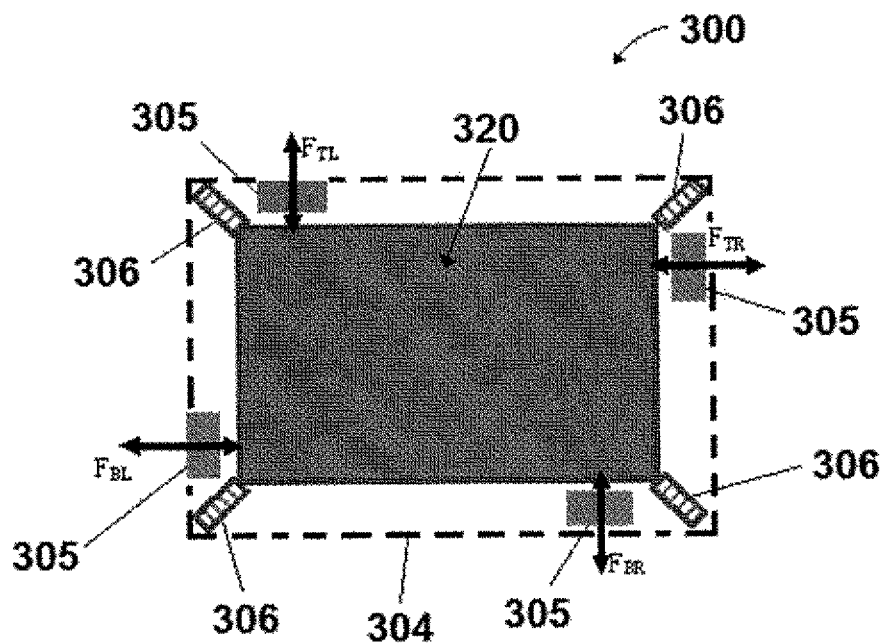
FIG. 3 is a diagram of an example input device in accordance with one or more embodiments of the invention.

Referring now to FIG. 3, a schematic view of an input device (300) is shown. As shown, the input device (300) includes an input surface (320) to contact a plurality of input objects, e.g., the input objects (140) shown in FIG. 1. In one or more embodiments, the plurality of input objects includes a first input object and a second input object, e.g., a first finger of a user and a second finger of the user. Further, in one or more embodiments, the input device (300) includes a plurality of sensor electrodes to determine positional information for the plurality of input objects on the input surface (320). In one or more embodiments, the plurality of sensor electrodes determine force applied by the input objects, e.g., the input objects (140), on the input surface (320). For more information on sensor electrodes, see FIG. 1 and the accompanying description.

Further, as shown in FIG. 3, the input device (300) includes a plurality of actuators (305) to move the input surface (320) to provide haptic feedback to the first input object, e.g., a first finger of a user, contacting the input surface (320) and to isolate haptic feedback to the second input object, e.g., a second finger of the user, contacting the input surface (320). As discussed above, the plurality of actuators (305) may include an electromagnet, a piezoelectric assembly, or other assembly that may be actuated to move the input surface (320) of the input device (300). In one or more embodiments, the plurality of actuators (305) may induce forces, e.g., to push and/or to pull the input surface (320), in at least one of the directions $F_{TL}$, $F_{TR}$, $F_{BR}$, and $F_{BL}$ shown in FIG. 3.

In one or more embodiments, the input surface is coupled to a housing via a plurality of springs. As shown in FIG. 3, the input surface (320) is coupled to a housing (304) via a plurality of springs (306). In one or more embodiments, the plurality of springs (306) may possess substantially similar spring constants "k" and may bias the input surface (320) toward a resting, initial position relative to the housing (304). For example, in one or more embodiments, the plurality of springs (306) may couple the input surface (320) to the housing (304) and may also collectively provide a biasing force to bias the input surface (320) toward a resting, initial position relative to the housing (304), e.g., toward a center of the housing (304).

In one or more embodiments, the biasing force(s) provided by the plurality of springs (306) may resist a resultant force provided by the plurality of actuators (305). As such, in one or more embodiments, actuation of the plurality of actuators (305) may require a resultant force greater than the biasing force(s) provided by the plurality of springs (306) in order to move the input surface (320) relative to the housing (304). Upon relief of the resultant force induced by actuation of the plurality of actuators (305), e.g., upon deactuation of the plurality of actuators (305), the plurality of springs (306) may bias the input surface (320) toward a resting, initial position relative to the housing (304), e.g., toward a center of the housing (304) such that a plane of the input surface (320) is substantially parallel to a plane of a bottom surface of the housing (304).

Figure 4A:
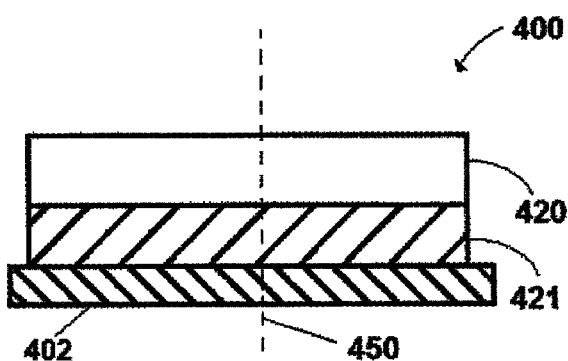
FIG. 4A is a cross-sectional view of an example input surface of an input device in accordance with one or more embodiments of the invention.

In one or more embodiments, the input device, according to embodiments disclosed herein, may include an elastic layer disposed below the input surface. Referring now to FIG. 4A, a cross-sectional view of an input surface (420) of an input device (400) is shown. As shown, the input device (400) may include an elastic layer (421) disposed below the input surface (420) and above a rigid support substrate (402). In one or more embodiments, the rigid support substrate (402) may be considered part of a housing of an input device. In one or more embodiments, the elastic layer (421) disposed below the input surface (420) may provide an elastic or restoring feedback to a user contacting the input surface (420). In other words, in one or more embodiments, the elastic layer (421) disposed below the input surface (420) may allow the input surface (420) to displace in a direction along an axis (450) of the input device (400). In one or more embodiments, the elastic layer (421) may be formed from foam or any other elastic material.

Figure 4B:
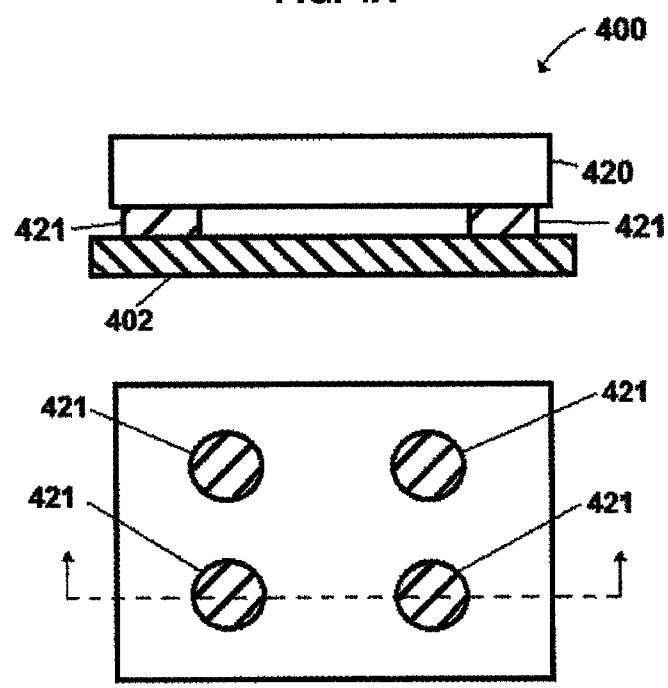
FIG. 4B shows a bottom and cross-sectional view of an example input surface of an input device in accordance with one or more embodiments of the invention.

As shown in FIG. 4B, one or more embodiments may include an elastic layer (421) that is not necessarily uniform across the input surface (420). As shown, in one or more embodiments, the elastic layer (421) may be disposed at specific areas beneath the input surface (420). As such, the input surface (420) may be coupled to the rigid support substrate (402) via the elastic layer (421), which may be disposed at specific areas between the input surface (420) and the rigid support substrate (402), as shown in FIG. 4B. In one or more embodiments, the elastic layer (421) may possess a spring constant or modulus of elasticity may bias the input surface (420) toward a resting, initial position relative to the rigid support substrate (402). For example, in one or more embodiments, the elastic layer (421) may couple the input surface (420) to the rigid support substrate (402) and may also collectively provide a biasing force to bias the input surface (420) toward a resting, initial position relative to the rigid support substrate (402), e.g., away from the rigid support substrate (402).

In one or more embodiments, the haptic feedback provided by the actuator may be based on at least one of a position and a force applied by the second input object. For example, referring back to FIG. 2, in one or more embodiments, the degree to which the plurality of actuators (205A), (205B), (205C), and (205D) are actuated may be based on at least one of a force applied by an input object, e.g., the second finger of the user, and a position of the input object, both of which may be determined by the plurality of sensor electrodes. In other words, the resultant force that is induced on the input surface (220) and that may cause the input surface (220) to move may be based on at least one of a position and a force applied by the input object.

For example, in one or more embodiments, based on position and force applied by a first input object and by a second input object, as determined by a plurality of sensor electrodes, the plurality of actuators (205A), (205B), (205C), and (205D) may actuate in such a way that the resultant force induces planar rotation of the input surface (220) about the axis (250) and forces the input surface (220) to rotate in a clockwise direction and in which the center of rotation of the input surface (220) is located directly below a contact area between the second input object and the input surface (220), which would result in haptic feedback to the first input object contacting the input surface (220) and isolation of haptic feedback to the second input object contacting the input surface (220).

Figure 5:
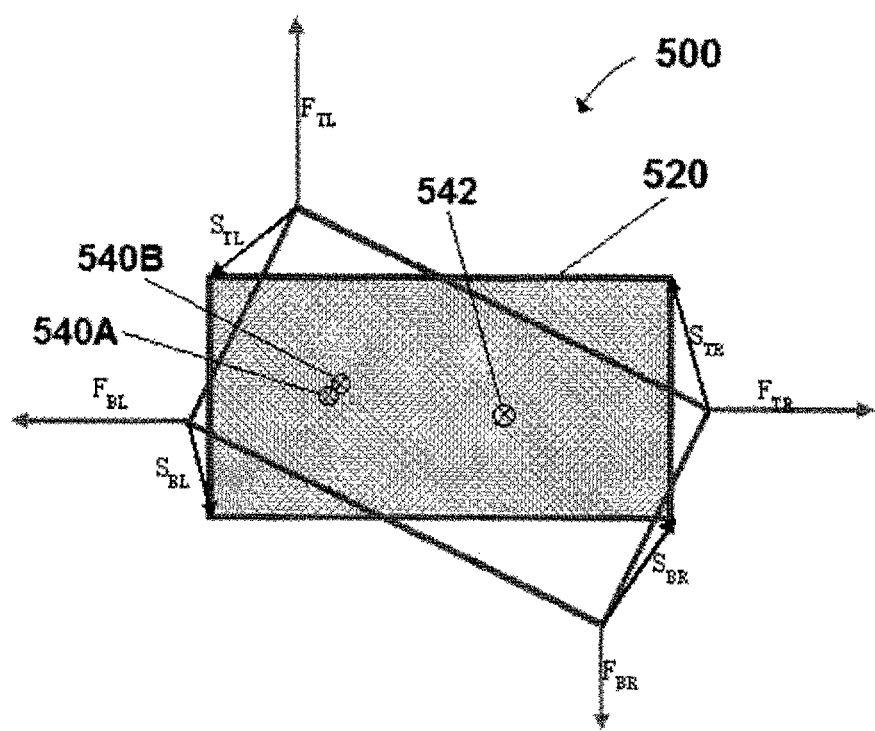
FIG. 5 is a schematic diagram showing example forces that may act on an example input device in accordance with one or more embodiments of the invention.

Referring to FIG. 5, a schematic diagram of an input device (500) having an input surface (520) is shown. In one or more embodiments, a plurality of sensor electrodes, e.g., discussed above with regard to FIG. 1, are configured to determine positional information for a plurality of input objects, e.g., the input objects (140) of FIG. 1, and to determine force applied by a plurality of input objects on the input surface (520). For example, the sensor electrodes may detect changes in capacitance resulting from forces applied to the input surface (520) of the input device (500), e.g., by the plurality of input objects. For more information on sensor electrodes, see FIG. 1 and the accompanying description.

In one or more embodiments, based on position and force information of a plurality of input objects, e.g., a first input object and a second input object, obtained by the plurality of sensor electrodes, an actuator or a plurality of actuators may actuate and may collectively induce a resultant force that may cause haptic feedback to the first input object and may isolate haptic feedback to the second input object. For example, referring back to FIG. 2, based on position and force information of a plurality of input objects, e.g., a first input object and a second input object, obtained by the plurality of sensor electrodes, an actuator, e.g., actuators (205A), (205B), (205C), and/or (205D), may actuate and may collectively induce a resultant force that may move the input surface (220) in a way to cause haptic feedback to the first input object and to isolate haptic feedback to the second input object. As discussed above, in one or more embodiments, movement of the input surface (220) may include displacement of the input surface (220) relative to an input object in a direction of a first axis (251) and/or a second axis (252) relative to the first input object. Moreover, in one or more embodiments, movement of the input surface (220) may include rotation of the input surface (220) relative to an input object about the axis (250), the first axis (251), and/or the second axis (252).

Referring back to FIG. 5, in one or more embodiments, forces generated on the input surface (520), e.g., by actuators such as the plurality of actuators (205A), (205B), (205C), and/or (205D) shown in FIG. 2, may be defined as:

$$\vec{F}_{TL} = (0, +F_{TLy})$$

$$\vec{F}_{TR} = (+F_{TRx}, 0)$$

$$\vec{F}_{BR} = (0, -F_{BRy})$$

$$\vec{F}_{BL} = (-F_{BLx}, 0)$$

In one or more embodiments, a composite resultant applied force applied to the input surface (520) may be defined as:

$$\vec{F}_C = (F_{Cx}, F_{Cy}) = \vec{F}_{TL} + \vec{F}_{TR} + \vec{F}_{BR} + \vec{F}_{BL}$$

As discussed above with reference to FIG. 3, in one or more embodiments, the input surface (320) is coupled to a housing (304) via a plurality of springs (306). In one simplified embodiment, the plurality of springs (306) may possess substantially similar and linear spring constants "k" and may bias the input surface (320) toward a resting, initial position relative to the housing (304). For each spring (306), we can define the corresponding force as:

$$\vec{S}_{TL} = \overrightarrow{kTL}$$

$$\vec{S}_{TR} = \overrightarrow{kTR}$$

$$\vec{S}_{BR} = \overrightarrow{kBR}$$

$$\vec{S}_{BL} = \overrightarrow{kBL}$$

In one or more embodiments, these forces depend on the equilibrium position of the input surface (520), which may be defined by translation $T_X, T_Y$ and rotation $\theta$. In one or more embodiments, translation $T_X, T_Y$ and rotation $\theta$ may be determined from force and torque equilibrium conditions. In other words, the composite resultant applied forces $\vec{F}_{TL}, \vec{F}_{TR}, \vec{F}_{BR}, \vec{F}_{BL}$ may be defined as functions of $T_X, T_Y, \theta$.

In one or more embodiments, in order to generate a specific haptic response, a location of the rotation center of the input surface (520) may be determined. As discussed above, the rotation center of the input surface (520) is a location on the input surface (520) that does not receive any haptic response. For example, in one or more embodiments, if an input object, e.g., a user's second finger, contacts the input surface (520) at the center of rotation of the input surface (520), haptic feedback will be isolated from the input object because the center of rotation of the input surface (520) is located directly below a contact area between the input object and the input surface (520). In one or more embodiments, after determining $T_X, T_Y, \theta$ from the position of the rotation center, the forces $\vec{F}_{TL}, \vec{F}_{TR}, \vec{F}_{BR}, \vec{F}_{BL}$ may be obtained, and the plurality of actuators may be driven accordingly.

For example, as shown, a first input object (540A), (540B) and a second input object (542) are shown engaging the input surface (520). As shown, the location of the rotation center of the input surface (520) may be positioned directly below the contact area of the second input object (542). When the location of the rotation center of the input surface (520) may be positioned directly below the contact area of the second input object (542), haptic feedback will be isolated from the second input object (542). Because the second input object (542) may contact any portion of the input surface (520), the location of the rotation center of the input surface (520) may also be located at any portion of the input surface (520) and may be determined by actuation of the plurality of actuators.

Further, as shown, the first input object has an initial position (540A) and a subsequent position (540B). As discussed above, as shown, haptic feedback will be isolated from the second input object (542). Further, as shown, a specific haptic response is imparted onto the first input object, which may displace the first input object from the initial position (540A) to the subsequent position (540B) by way of rotation of the input surface (520) about the rotation center of the input surface (520), which is determined by actuation of the plurality of actuators. In one or more embodiments, haptic feedback on the first input object may be interpreted as displacement of the first input object from the initial position (540A) to a subsequent position, e.g., the subsequent position (540B), by way of rotation of the input surface (520) about a rotation center that is not located directly below the contact area of the first input object.

Figure 6A:
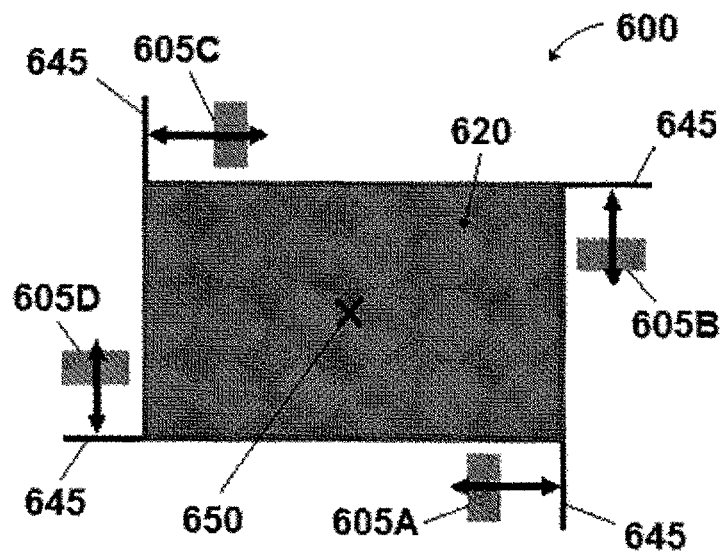
FIG. 6A is a schematic diagram of an example input device in accordance with one or more embodiments of the invention.
Figure 6B:
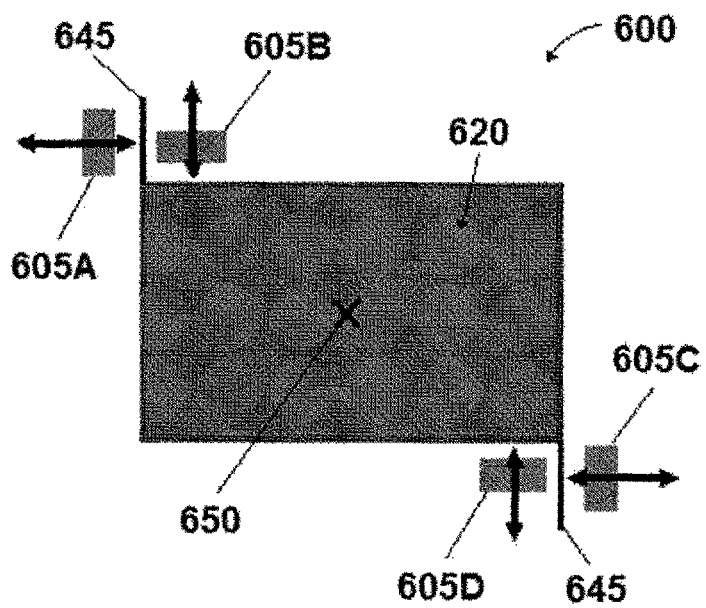
FIG. 6B is a schematic diagram of an example input device in accordance with one or more embodiments of the invention.

Referring now to FIGS. 6A and 6B, a schematic view of an input device (600) is shown. As shown, the input device (600) includes an input surface (620) to contact a plurality of input objects, e.g., the input objects (540A), (540B), and (542) shown in FIG. 5. In one or more embodiments, the input device (600) may include one or more linkages (645) coupled to the input surface (620). In one or more embodiments, a plurality of actuators (605A), (605B), (605C), and (605D) may be coupled to or may be directly engaged with one or more linkages (645) such that a resultant force applied by the plurality of actuators (605A), (605B), (605C), and (605D) may be applied indirectly to the input surface (620) to rotate the input surface (620) about axis (650). For example, in one or more embodiments, a resultant force applied by the plurality of actuators (605A), (605B), (605C), and (605D) may be applied directly to the linkages (645) instead of being applied directly to the input surface (620) itself. Because the linkages (645) may extend from the input surface (620), a resultant torque applied to the input surface (620) may be manipulated by a length of each of the linkages (645) as well as by the contact area of the actuators (605A), (605B), (605C), and (605D) on the one or more linkages (645).

In one or more embodiments, one or more of the plurality of actuators (605A), (605B), (605C), and (605D) may be directly engaged with a single linkage (645). Further, in one or more embodiments, one or more of the plurality of actuators (605A), (605B), (605C), and (605D) may be directly engaged with one or more of the linkages (645), and one or more of the plurality of actuators (605A), (605B), (605C), and (605D) may be directly engaged with the input surface (620). For example, as shown in FIG. 6B, composite forces of the plurality of actuators (605A), (605B), (605C), and (605D) may be applied in only two corners of the input surface (620) (as opposed to being applied in all four corners), and the actuators (605A) and (605C) are directly engaged with the linkages (645) while the actuators (605B) and (605D) are directly engaged with the input surface (620). As such, as shown, forces generated by the actuators (605A) and (605C) are applied indirectly to the input surface (620) through the linkages (645), and forces generated by the actuators (605B) and (605D) are applied directly to the input surface (620).

One or more embodiments are directed to a processing system for an input device. In one or more embodiments, the processing system includes a sensor module including circuitry coupled to a plurality of sensor electrodes. In one or more embodiments, the sensor module is configured to transmit transmitter signals and to receive resulting signals with at least a portion of the plurality of sensor electrodes. The processing system also includes a determination module including circuitry configured to determine positional information for a plurality input objects simultaneously contacting an input surface.

For example, as shown in FIG. 1, the processing system (110) includes a sensor module (160) that includes circuitry coupled to a plurality of sensor electrodes. In one or more embodiments, the sensor module (110) is configured to transmit transmitter signals and to receive resulting signals with at least a portion of the plurality of sensor electrodes. The processing system (110) also includes a determination module (150) that includes circuitry configured to determine positional information for a plurality input objects (140) simultaneously contacting an input surface (120).

In one or more embodiments, the plurality of input objects includes a first input object and a second input object. In one or more embodiments, the determination module is configured to determine positional information of the first input object, determine positional information of the second input object, determine a subsequent location of the first input object, and actuate an actuator to provide haptic feedback to the first input object and to isolate haptic feedback to the second input object.

For example, referring back to FIG. 1 and FIG. 2, the plurality of input objects (140) may include a first finger of a user as a first input object and a second finger of the user as a second input object. In one or more embodiments, the determination module (150) may determine positional information of the first input object and the second input object on the input surface (120), (220). In one or more embodiments, the determination module (150) may also determine a subsequent location of the first input object on the input surface (120), (220) and may actuate an actuator, e.g., actuators (205A), (205B), (205C), and/or (205D), to provide haptic feedback to the first input object and to isolate haptic feedback to the second input object.

In one or more embodiments, the actuator actuates to align a center of rotation of the input surface with a contact area of the second input object on the input surface to isolate haptic feedback to the second input object. Further, in one or more embodiments, the center of rotation of the input surface is aligned with the contact area of the second input object on the input surface by manipulating a plurality of forces acting on the input surface provided by the actuator.

As discussed above, in one or more embodiments, providing and isolation of haptic feedback to a plurality of input objects may be based on force information as well as position information, as determined by a plurality of sensor electrodes. Still referring generally to FIG. 1 and FIG. 2, the determination module (150) may use position and/or force information regarding the first input object and the second-input object obtained by the plurality of sensor electrodes of the sensor module (160) to provide haptic feedback to the first input object and to isolate haptic feedback to the second input object. For example, based on the position and/or force information of the first input object and the second input object, the plurality of actuators (205A), (205B), (205C), and (205D) may actuate in such a way that the resultant force induces movement of the input surface (220), e.g., planar rotation of the input surface (220) about the axis (250), which may the input surface (220) to rotate in a clockwise direction or a counter-clockwise direction.

This resultant force determined by the determination module (150) and applied to the input surface (220) by the plurality of actuators (205A), (205B), (205C), and (205D) may cause the center of rotation of the input surface (220) to be located directly below a contact area between the second input object and the input surface (220), which would result in haptic feedback to the first input object contacting the input surface (220) and isolation of haptic feedback to the second input object contacting the input surface (220). In other words, in one or more embodiments, the determination module (150) is capable of modifying the resultant force applied to the input surface (220), e.g., by the plurality of actuators (205A), (205B), (205C), and (205D) and/or the plurality of springs (306) shown in FIG. 3, to move the input surface (220) and to align the center of rotation of the input surface (220) with the contact area of the second input object on the input surface (220) by manipulating a plurality of forces acting on the input surface provided by the actuator, e.g., actuators (205A), (205B), (205C), and (205D).

In one or more embodiments, the plurality of forces acting on the input surface provided by the actuator are determined by the determination module based on a force applied by at least one of the first input object and the second input object. Further, in one or more embodiments, the force applied by at least one of the first input object and the second input object is determined by the plurality of sensor electrodes of the sensor module. For example, referring back to FIG. 1 and FIG. 2, the plurality of forces acting on the input surface (220) provided by the actuator, e.g., actuators (205A), (205B), (205C), and (205D), are determined by the determination module (150) based on a force applied by at least one of the first input object and the second input object. Further, the force applied by at least one of the first input object and the second input object is determined by the plurality of sensor electrodes of the sensor module (160).

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

Thus, while the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An input device comprising:
    an input surface to contact a plurality of input objects, the plurality of input objects comprising a first input object and a second input object;
    a plurality of sensor electrodes to determine positional information for the plurality of input objects on the input surface; and
    an actuator that provides haptic feedback to the first input object contacting the input surface and isolates the second input object contacting the input surface from the haptic feedback by rotating the entire input surface about a first axis that is parallel to a plane of the input surface,
        wherein the actuator aligns a center of rotation of the input surface with a contact area of the second input object on the input surface to isolate the second input object from the haptic feedback, and
        wherein the actuator comprises a plurality of individually controllable actuators, each disposed in a different peripheral location of the input surface, and each exerting a force selected to produce, in combination, a resultant force, causing the rotation of the entire input surface about the first axis.

2. The input device of claim 1, wherein the actuator also rotates the input surface in at least one of a first planar direction and a second planar direction, wherein both the first planar direction and the second planar direction are about an axis that extends in a direction perpendicular to the plane of the input surface.

3. The input device of claim 1, wherein the actuator moves the input surface with three degrees of freedom.

4. The input device of claim 3, wherein the actuator also moves the input surface about a second axis that is parallel to the plane of the input surface and perpendicular to the first axis.

5. The input device of claim 4, wherein the actuator isolates haptic feedback to a third input object that contacts the input surface.

6. The input device of claim 1, wherein the actuator comprises at least one of an electromagnet and a piezoelectric assembly.

7. The input device of claim 1, wherein the input surface is coupled to a housing via a plurality of springs.

8. The input device of claim 1, wherein the plurality of sensor electrodes determine force applied by the plurality of input objects on the input surface.

9. The input device of claim 1, wherein the haptic feedback provided by the actuator is based on at least one of a position and a force applied by the second input object.

10. The input device of claim 1, further comprising:
an elastic layer disposed below the input surface.

11. A processing system for an input device, the processing system comprising:
a sensor module comprising circuitry coupled to a plurality of sensor electrodes, the sensor module configured to transmit transmitter signals and to receive resulting signals with at least a portion of the plurality of sensor electrodes; and
a determination module comprising circuitry configured to determine positional information for a plurality input objects simultaneously contacting an input surface,
wherein the plurality of input objects comprises a first input object and a second input object, and
wherein the determination module is configured to:
determine positional information of the first input object,
determine positional information of the second input object,
determine a subsequent location of the first input object, and
actuate an actuator that provides haptic feedback to the first input object and isolates the second input object from the haptic feedback by rotating the entire input surface about an axis that is parallel to a plane of the input surface,
wherein the actuator comprises a plurality of individually controllable actuators, each disposed in a different peripheral location of the input surface, and each exerting a force selected to produce, in combination, a resultant force, causing the rotation of the entire input surface about the axis.

12. The processing system of claim 11, wherein the actuator also rotates the input surface in at least one of a first planar direction and a second planar direction, wherein both the first planar direction and the second planar direction are about an axis that extends in a direction perpendicular to the plane of the input surface.

13. The processing system of claim 11, wherein the haptic feedback provided by the actuator is based on at least one of a position and a force applied by the second input object.

14. The processing system of claim 11, wherein the actuator also aligns a center of rotation of the input surface with a contact area of the second input object on the input surface to isolate the second input object from the haptic feedback.

15. The processing system of claim 14, wherein the center of rotation of the input surface is aligned with the contact area of the second input object on the input surface by manipulating a plurality of forces acting on the input surface provided by the actuator.

16. The processing system of claim 15, wherein the plurality of forces acting on the input surface provided by the actuator act proximate to corner portions of the input surface.

17. The processing system of claim 15, wherein the plurality of forces acting on the input surface provided by the actuator are determined by the determination module based on a force applied by at least one of the first input object and the second input object.

18. The processing system of claim 17, wherein the force applied by at least one of the first input object and the second input object is determined by the plurality of sensor electrodes of the sensor module.

* * * * *